United States Patent
Eastman

(10) Patent No.: US 11,036,271 B2
(45) Date of Patent: Jun. 15, 2021

(54) RESERVE POWER PLANNING SYSTEM

(71) Applicant: Server Farm Realty, LLC, El Segundo, CA (US)

(72) Inventor: David Eastman, El Segundo, CA (US)

(73) Assignee: Server Farm Realty, LLC, El Segundo, CA (US)

( * ) Notice: Subject to any disclaimer, the term of this patent is extended or adjusted under 35 U.S.C. 154(b) by 0 days.

(21) Appl. No.: 16/547,328

(22) Filed: Aug. 21, 2019

(65) Prior Publication Data
US 2020/0285293 A1    Sep. 10, 2020

Related U.S. Application Data

(60) Provisional application No. 62/814,665, filed on Mar. 6, 2019.

(51) Int. Cl.
*G06F 11/00* (2006.01)
*G06F 1/30* (2006.01)

(52) U.S. Cl.
CPC ...................... *G06F 1/30* (2013.01)

(58) Field of Classification Search
CPC ... G06F 1/263; G06F 1/28; G06F 1/30; G06F 1/305; G06F 11/20; G06F 11/2015; G06F 9/50–5055; G06F 9/5061–5094; H04L 41/0896; H04L 41/0806; H04L 41/5019; H02J 2310/10–23; H02J 1/00; H02J 1/001; H02J 1/10; H02J 1/106; H02J 1/109; H02J 9/00
See application file for complete search history.

(56) References Cited

U.S. PATENT DOCUMENTS

| | | | | |
|---|---|---|---|---|
| 6,125,396 A | * | 9/2000 | Lowe | G06F 9/5011 709/234 |
| 6,625,736 B1 | * | 9/2003 | Berthaud | G06F 1/263 713/300 |
| 10,747,289 B2 | * | 8/2020 | Ramamurthy | G06F 1/3203 |
| 10,824,215 B2 | * | 11/2020 | Rong | G06F 9/5094 |
| 2004/0193728 A1 | * | 9/2004 | Doshi | H04L 41/0663 709/238 |

(Continued)

OTHER PUBLICATIONS

Gersht etal., "Dynamic Bandwidth-Allocation and Path-Restoration in SONET Self-Healing Networks", IEEE Transactions on Reliability, vol. 45, No. 2, Jun. 1996, pp. 321-331 (Year: 1996).*

(Continued)

*Primary Examiner* — Michael Maskulinski
(74) *Attorney, Agent, or Firm* — Perkins Coie LLP

(57) ABSTRACT

Methods and systems are provided performed by a computing system is provided for determining reserve power for power supply elements in a power distribution system. A method determines the non-failure power supplied by each power panel. The non-failure power is the power supplied during normal operation, that is when no panel fails. Then, for each panel, the method designates that panel as failed and determines a failure power supplied by each panel assuming that the designated panel has failed. For each panel, the method also determines a maximum failure power supplied by that panel and sets a reserve power for that panel to the difference between the maximum failure power and the non-failure power for that panel.

21 Claims, 11 Drawing Sheets

(56) References Cited

U.S. PATENT DOCUMENTS

| | | | | |
|---|---|---|---|---|
| 2011/0102996 A1* | 5/2011 | Janick | ............... | G06F 1/26 |
| | | | | 361/679.31 |
| 2014/0208129 A1* | 7/2014 | Morales | ............ | H02J 9/06 |
| | | | | 713/300 |
| 2014/0258535 A1* | 9/2014 | Zhang | ............ | H04L 45/48 |
| | | | | 709/226 |
| 2014/0310537 A1* | 10/2014 | Messick | ........... | G06F 1/263 |
| | | | | 713/300 |
| 2015/0227181 A1* | 8/2015 | Khessib | ........... | G06F 1/263 |
| | | | | 713/300 |
| 2015/0370301 A1* | 12/2015 | Bolan | ............ | G06F 1/263 |
| | | | | 713/322 |
| 2018/0032120 A1* | 2/2018 | Maheswaran | ......... | G06F 1/263 |
| 2019/0004579 A1* | 1/2019 | Allen-Ware | ......... | G06F 1/3228 |
| 2019/0097455 A1* | 3/2019 | Gu | ................... | G06F 1/266 |

OTHER PUBLICATIONS

ABB Data Centers 3D Configurator Whitepaper, Feb. 12, 2019, pp. 1-8 (Year: 2019).*

International Search Report and Written Opinion received in International Application No. PCT/US2020/021261 dated Apr. 7, 2020.

* cited by examiner

600
No Failures

| | D1 | D2 | SP2.1 | SP2.2 | SP2.3 | SP1.1 | SP1.2 | Total |
|---|---|---|---|---|---|---|---|---|
| D1    | 400 | 0    | 0   | 0   | 100 | 0 | 0 | 400 |
| D2    | 0   | 1000 | 0   | 0   | 0   | 0 | 0 | 100 |
| SP2.1 | 100 | 0    | 0   | 0   | 0   | 0 | 0 | 100 |
| SP2.2 | 100 | 250  | 0   | 0   | 0   | 0 | 0 | 350 |
| SP2.3 | 100 | 250  | 0   | 0   | 0   | 0 | 0 | 350 |
| SP1.1 | 0   | 0    | 100 | 175 | 0   | 0 | 0 | 275 |
| SP1.2 | 0   | 250  | 0   | 0   | 350 | 0 | 0 | 600 |

*FIG. 6*

700
SP2.1 Failure

| | D1 | D2 | SP2.1 | SP2.2 | SP2.3 | SP1.1 | SP1.2 | Total |
|---|---|---|---|---|---|---|---|---|
| D1    | 400 | 0    | 0 | 0   | 0   | 0 | 0 | 400 |
| D2    | 0   | 1000 | 0 | 0   | 0   | 0 | 0 | 100 |
| SP2.1 | —   | —    | — | —   | —   | — | — | —   |
| SP2.2 | 133 | 250  | 0 | 0   | 0   | 0 | 0 | 383 |
| SP2.3 | 133 | 250  | 0 | 0   | 0   | 0 | 0 | 383 |
| SP1.1 | 0   | 0    | 0 | 191 | 0   | 0 | 0 | 191 |
| SP1.2 | 0   | 250  | 0 | 0   | 383 | 0 | 0 | 633 |

*FIG. 7*

US 11,036,271 B2

RESERVE POWER PLANNING SYSTEM

CROSS-REFERENCE TO RELATED APPLICATION

This application is a continuation of U.S. Provisional Patent Application No. 62/814,665 filed on Mar. 6, 2019, entitled RESERVE POWER PLANNING SYSTEM, which is hereby incorporated by reference in its entirety.

BACKGROUND

A data center (e.g., data center) may have many thousands of computers (e.g., servers) that are accessible by customers via the internet. The servers of the data center host the applications of its customers. Those customers may be organizations that provide services to their customers. For example, an airline may be a customer that hosts its web site in a data center. When a prospective passenger wants to access the web pages of the airline's web site (e.g., to make a reservation), the prospective passenger would enter the uniform resource locator of the web page which is ultimately sent to a server of the possibly hundreds of servers that host the airline's web site. The airline may also have applications hosted by the data center to keep its passengers apprised of various alerts such as canceled flights, rescheduled flights, gate changes, and so on. It is critical to the airline that the data center has sufficient number of servers available to support its data processing needs. If a sufficient number of servers is not available, then potential passengers may not be able to make reservations and passengers may get frustrated when timely alerts are not received. In both cases, the airline may lose money because potential passengers and passengers may opt to make reservations with a different airline. If a data center does not have a sufficient number of servers available to meet its customers data processing needs, in addition to losing money, public safety may be endangered (e.g., the path of a hurricane may not be forecasted in a timely manner), a patient in a hospital may be at risk (e.g., an emergency room physician cannot access the patient's medical record), and so on.

Data centers implement complex power distribution systems to ensure each server has sufficient power. The power distribution system may be connected to multiple external power lines to supply power from different power generation facilities to the data center. The power distribution system may have power supply panels (e.g., main panels and subpanels) that distribute the power to the thousands of racks in which the servers of a data center are installed. To ensure that a rack is supplied sufficient power even when a power supply panel fails (a not uncommon event), the power distribution system may be designed with extensive redundancy. For example, the power distribution system may supply power to a rack from different subpanels. To provide this redundancy, a rack may be connected to three different subpanels so that if one subpanel fails sufficient power can be supplied by the other two subpanels. Each of three of subpanels would supply the same amount of power to the rack. For example, if the rack (i.e., servers of the rack) consume 300 W of power, then each subpanel would supply 100 W. When one of the subpanels fails, then each of the other two subpanels would supply 150 W. To ensure that sufficient power is supplied to each subpanel, each subpanel may itself be supplied power from multiple other subpanels.

The complexity of the power distribution system can increase with the addition of new components such as servers (e.g., with differing power consumptions), racks, subpanels (e.g., with differing power supply capacities), external power lines, and so on. As new components are added, an engineer at the data center may review the power distribution system to decide on to add new connections and/or change existing connections between existing and new power panels and between those panels and existing and new racks.

To support the redundancy needed when a power panel fails, an engineer may design the power distribution system so that each panel is configured to supply only a portion of its supply capacity in normal operation (e.g., non-failure operation). The difference between the capacity of a power panel and the power supplied during non-failure operation is referred to as "reserve power." Because of the complexity of a power distribution system, an engineer may take an "educated guess" at the needed reserve power for each panel. Oftentimes, the "educated guess" will be very conservative to be sure that needed reserve power for each panel is available. Continuing with the example of three subpanels supplying power to a rack, the engineer may designate each panel to have a reserve of 100 W, which is 50 W more than the actual reserve needed. Other times, the "educated guess" may be insufficient in that the needed reserve power is not available when needed. For example, the engineer may designate one panel to have a reserve of 25 W, which is 25 W than the actual reserve needed. Both "educated guesses" present problems. A conservative "educated guess" can result in significant over capacity in the power distribution system which can be very expensive. The increased expense is because additional costly panels and new external power connections may be needed and because the complexity is increased resulting in more difficulty in providing an accurate "educated guess." An insufficient "educated guess" results in insufficient power being supplied to some racks when a panel fails resulting in the servers of the racks not being available to meet the data processing needs of the customers of the data center.

BRIEF DESCRIPTION OF THE DRAWINGS

FIG. 6 contains a matrix 600 of a failure table for a non-failure condition. The failure table includes a matrix for each failure condition.

FIG. 7 contains a matrix 700 of a failure table for a failure condition.

DETAILED DESCRIPTION

Figure 1:
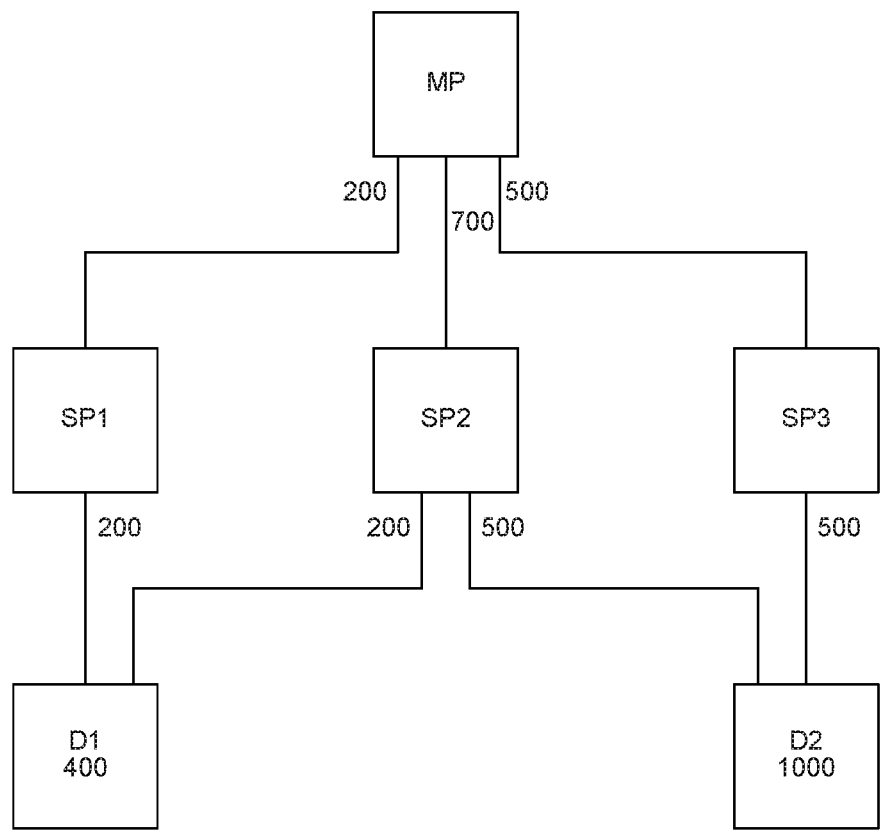
FIGS. 1-5 include diagrams 100-500 that indicate the non-failure powers of different power distribution systems and associated tables 101-105.
Figure 2:
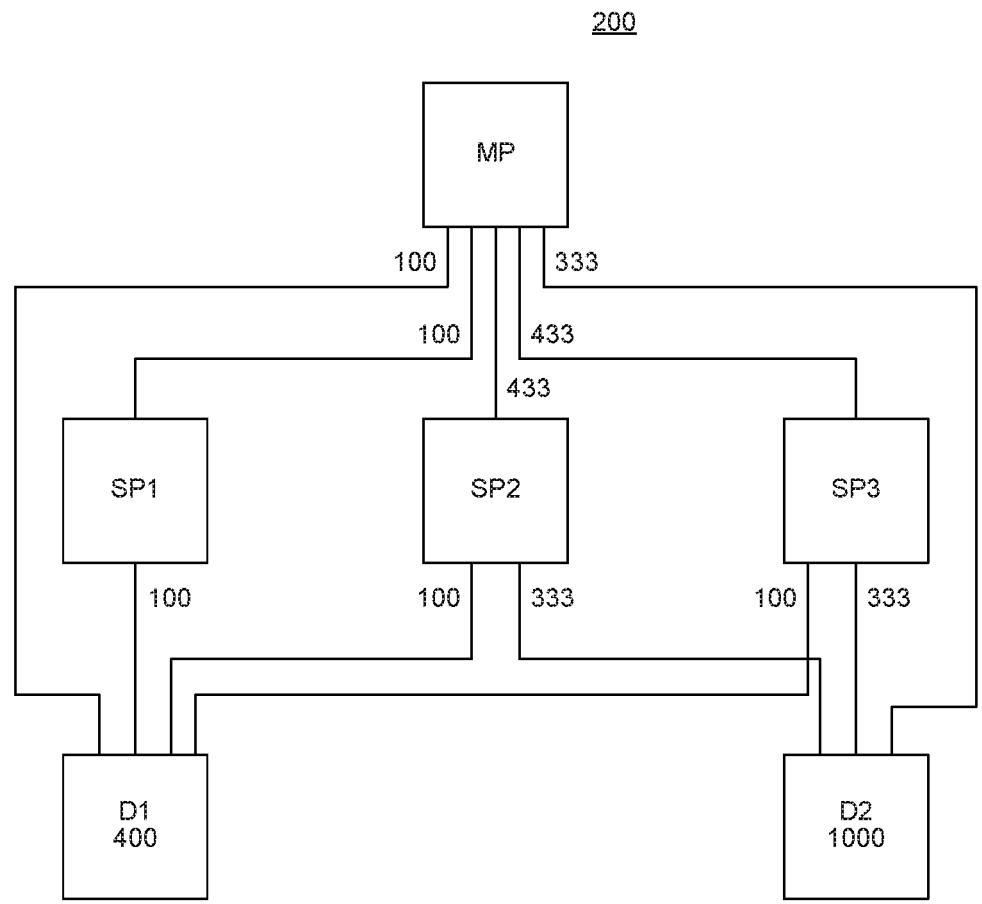

A method and system for determining reserve power for a power distribution system are provided. In some embodiments, a determine reserve power ("DRP") determines the reserve power for power supply ("PS") elements (e.g., main panel ("MP") and subpanels ("SP")) of the power distribution system. Each PS element supplies power to other PS elements or power consumption ("PC") elements (e.g., racks or servers). The PS elements and the PC elements are power elements of the power distribution system. To determine the reserve power needed by the PS elements, the DRP system determines the power (referred to as non-failure power) supplied by each PS element when no PS element fails (i.e., a non-failure condition). Continuing with the example (described in the Background) of three PS elements (i.e., a first, second, and third PS element) that supply power to a PC element that consumes 300 W, the non-failure power of each PS element is 100 W. The DRP system also determines, for each PS element, the power (referred to as failure power) supplied when each of the other PS elements fails (i.e., a failure condition). When the first PS element fails (or fails to supply power because another PS element has failed), the failure power of the second PS element and the third PS element is 150 W. The reserve power of the second PS element and the third PS element would need to be 50 W to support a failure of the first PS element. The reserve power needed by a PS element for a failure is the failure power for that failure minus the non-failure power of the PS element (e.g., 150 W-100 W). If, however, the third PS element also supplied a non-failure power of 150 W to another PC element and a fourth PS element supplied a non-failure power of 150 W to that other PC element, then the third PS element would have a failure power of 300 W when the fourth PS element fails. So, the third PS element would need a reserve power of 150 W (e.g., 300 W-150 W) to support a failure of the fourth PS element. So, the reserve power needed by the third PS element to support any failure is 150 W, which is the maximum of the failure powers (i.e., 50 W and 150 W) that the third PS element supplies to power elements.

In the following, the DRP system is described in the context of determining reserve powers for a power distribution system. The DRP system can, however, be used to determine reserves in contexts other than for power. For example, the DRP system may be used to determine a reserve bandwidth for bandwidth supply elements in a bandwidth distribution system (e.g., communications bandwidth supplied to racks of a data center). Or more generally, the DRP system may be used to determine reserve resources for resource supply elements of a resource distribution system.

The DRP system is also described in the context in which each PS element that supplies power to a power element supplies an equal amount of power. For example, the first, second, and third PS elements described above supply a non-failure power of 100 W to each PC element, and when the first PS element fails, the second and third PS element supply 150 W each. The DRP system, however, can be used when PS elements that supply power to the same power element supply different amounts of non-failure power. For example, the first PS element may supply 50 W and the second PS element and the third PS element may supply 125 W to the PC element.

Once the DRP system determines the reserve powers for PS elements, the DRP system can take different actions. For example, the DRP system can output an indication of the reserve powers so that an engineer can ensure that each PS element has the needed reserve power and possibly an additional excess reserve power, for example, to account for an error in power supplied to a rack (e.g., 159 W, rather than 150 W). As another example, if the power distribution system includes a power connection system through which connections between power elements can be automatically changed, the DRP system can provide an indication of the power reserves of each PS element for different configurations of the power distribution systems. For example, if an PS element does not have sufficient capacity to support its reserve power, then the power distribution system can be assumed to be reconfigured with one of the child power elements of that PS element connected to another PS element. The DRP system can then be used to calculate the reserve powers for that reconfigured power distribution system. The process of assuming reconfiguration can be repeated until a configuration is identified in which each PS element has sufficient capacity to support its reserve power. An engineer can also specify different possible reconfigurations with different connection and different power elements. The power connection system can then automatically reconfigure connections between power elements in accordance the identified configuration.

The DRP system is described as determining power reserves with examples of when a single PS element fails. The algorithms of the DRP system that are described below can be adapted to determine power reserves when multiple PS elements fail. The algorithms below include a loop for selecting each PS element and determining failure powers assuming the selected PS element fails. To determine failure powers when two PS elements fail, the algorithms can be modified to include nested loops to select all possible combinations of pairs of PS elements and determine failure powers for each combination. The reserve power for a PS element would be its maximum failure power of the single failures and the double failures minus its non-failure power. For example, if both the first PS element and the second PS element fail, then the failure power of the third PS element is 300 W, and its reserve power is 200 W (i.e., max(150 W-100 W, 300 W-100 W).

FIGS. 1-5 include diagrams 100-500 that indicate the non-failure powers of different power distribution systems. The numbers indicate the non-failure power that each power element supplies to other power elements and the consumed power of each PC element.

In diagram 100, the power distribution system includes a main panel (MP), three subpanels (SP1, SP2, and SP3), and devices (D1 and D2) such as racks. D1 consumes 400 W, and D2 consumes 1000 W. SP1 supplies 200 W to D1, SP2 supplies 200 W to D1 and 500 W to D2, and SP3 supplies 500 W to D2. MP supplies 200 W to SP1, 700 W to SP2, and 500 W to SP3. The sum of power supplied by a PS element to each child power elements may be considered to be consumed power of that PS element.

Figure 3:
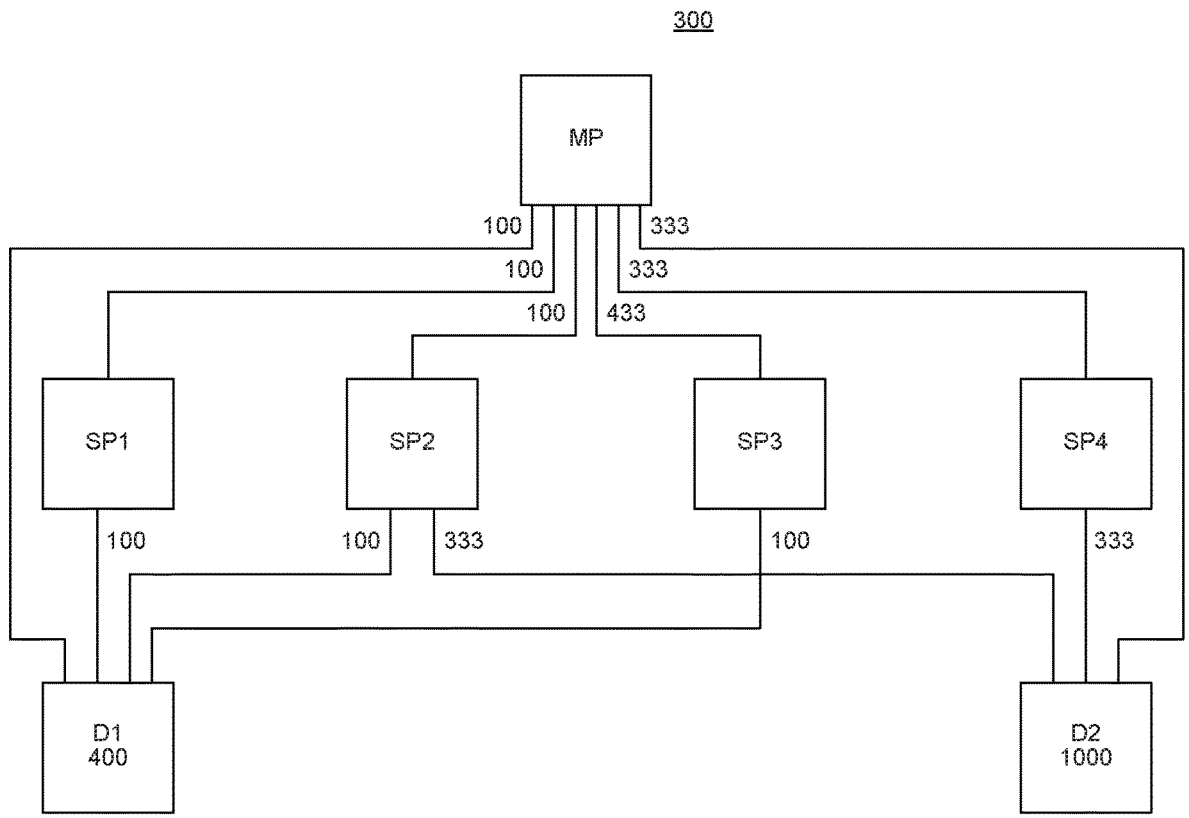
Figure 4:
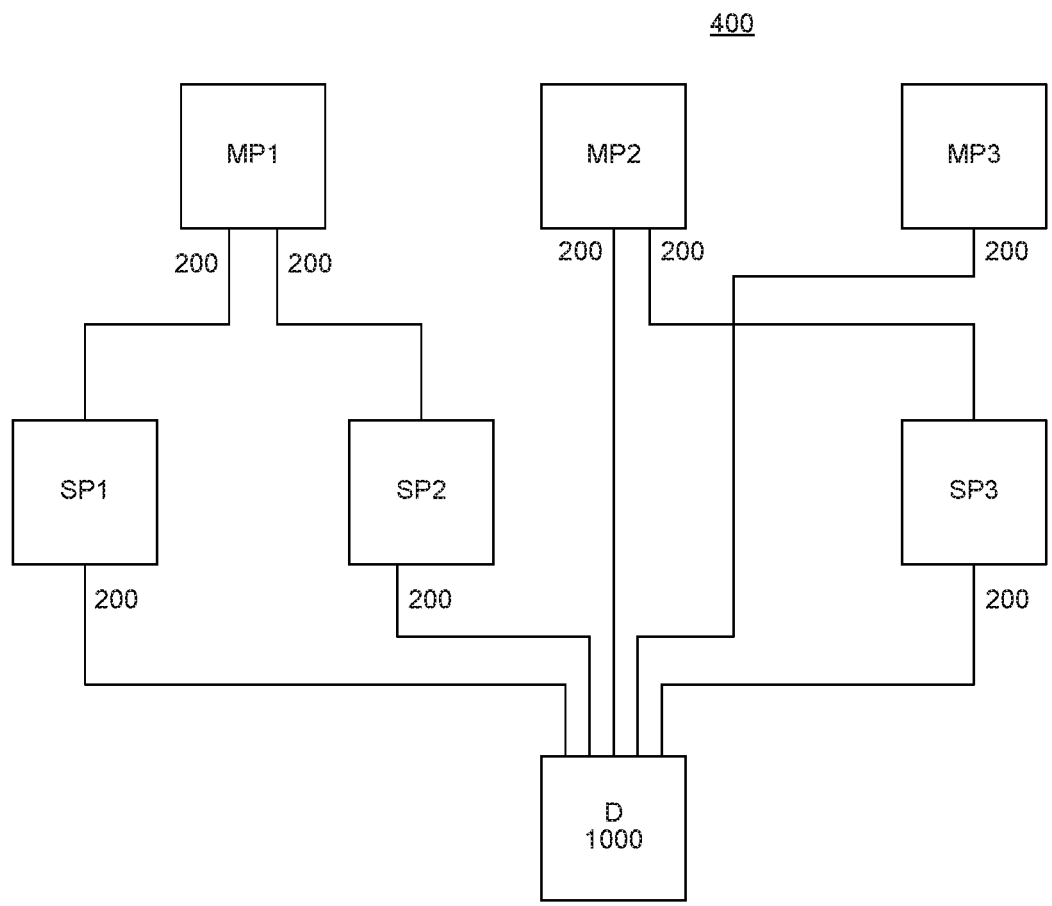
Figure 5:
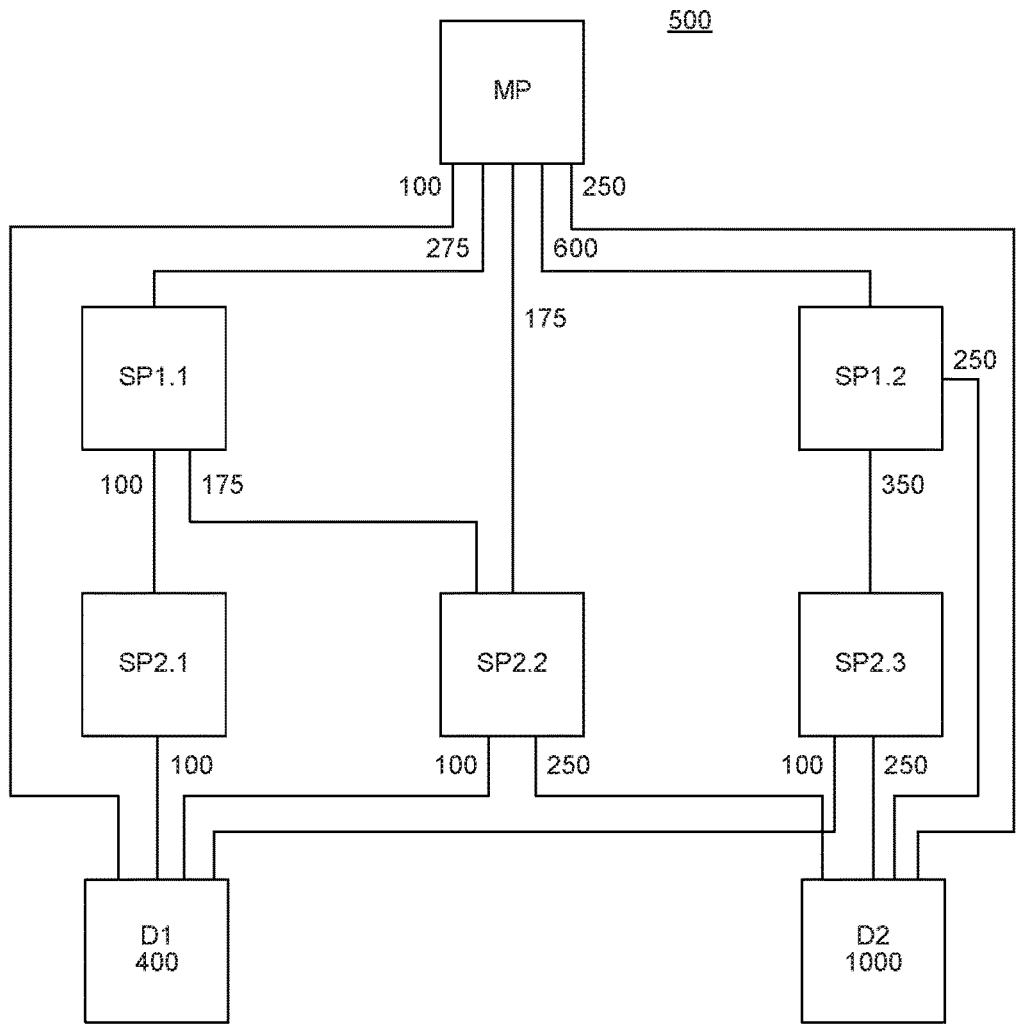

In diagram 200, the power distribution system also includes a main panel (MP) and three subpanels (SP1, SP2, and SP3), and devices (D1 and D2) such as racks. D1 consumes 400 W, and D2 consumes 1000 W. MP supplies 100 W to D1 and 333 W to D2, SP1 supplies 100 W to D1, SP2 supplies 100 W to D1 and 333 W to D2, and SP3 supplies 100 W to D1 and 333 W to D2. MP also supplies 100 W to SP1, 433 W to SP2, and 433 W to SP3. FIGS. 3 and 4 represent different power distribution systems.

FIGS. 1-5 also include tables 101-501 that specify, for each MP element and each PS element, the non-failure power and the failure powers supplied by that PS element to the other power elements for each possible failure of a PS element. Each table includes a column for each combination of a PS element and a PC element and a row for failure condition. Each PS element also includes a reserve column R (except for the MP element) with the amount of reserve needed for each failure. Each table also includes a Reserve row indicating the reserve needed for each PS element, which is the maximum of the reserves in the R column, that is the largest reserve needed by that PS element to support a power failure. The row for "none" specifies the non-failure power that is supplied by each PS element to each PC element.

Table 101 includes a row for each failure condition and a row for the reserve power for each PS element. The table includes a column for each combination of a PS element and a PC element. For example, the table contains a column for the MP element and D1 (identified as MP:D1) (circle 102) and a column for SP1 and D2 (identified as SP1:D2) (circle 103).

The intersection of a row and a column (except for the Reserve row) indicates the non-failure power or failure power supplied by the PS element to the PC element. The intersection of the last row (i.e., the Reserve row) and a PS element indicates the reserve power for that PS element. As examples, the non-failure power supplied by SP1 to D1 is 200 W as indicated by the row None and column SP1:D1 (identified as (None, SP1:D1)) (circle 104) and supplied by SP3 to D2 is 500 W as indicated by (None, SP3:D2) (circle 105). The row for SP2 specifies the power supplied when SP2 fails. When SP2 fails, the failure power supplied by SP3 to D2 is 1000 W as indicated by (SP2, SP3:D2) (circle 106). The columns for R represent the reserve needed to support each failure condition for each PS element. For example, the reserve power needed by SP2 to support a failure in SP1 is 200 W (circle 107). The 200 W represents the difference between the total power supplied when SP1 fails and the total power supplied without a failure (i.e., (400+500)−(200+500)). The "-" indicates that no reserve power is calculated for when the PS element fails. The MP element does not include an R column because the MP element is assumed to supply necessary power irrespective of the failure condition. However, if a power distribution system has multiple MP elements, a reserve power could be determined for an MP element when another MP element fails in a manner similar to determining the reserve power for a PS element that is a subpanel.

The Reserve row for specifies the reserve power of each PS element, which is the maximum of the values in the R column for that PS element. For example, the reserve power for SP2 is 500 W as indicated by (Reserve, SP2:R) (circle 108) because 500 W is the maximum of the values in column SP2:R.

Tables 201, 301, 401, and 501 contain information similar to table 101 except for different power distribution systems. For example, in table 201, the row for "none" specifies the non-failure power supplied by MP to D2 is 333 W (circle 202) and SP1 to D1 is 100 W (circle 203). The row for SP2 specifies the failure power supplied by MP to D2 is 500 W (circle 204) and SP3 to D1 is 500 W (circle 205). The Reserve row for specifies that SP2 has a reserve power of 200 W (circle 206), which is the maximum of the value in column SP2:R. Since diagram 400 includes multiple MP elements, the reserve power for each MP element can be calculated (although not illustrated) in table 401.

Diagram 500 illustrates a power distribution system with parent PS elements that supply power to child PS elements. The parent PS element SP1.1 supplies power to its child PS elements SP2.1 and SP2.2, and the parent PS element SP1.2 supplies power to its child PS element SP2.3 (and PC element D2). Table 501 specifies the non-failure and failure powers that the MP element and each child subpanel element (i.e., supplied power by another subpanel element) supplies to a PC element and the reserve power for each child subpanel element. For example, (SP1.1, SP2.2:D2) (circle 502) of the table 501 specifies 250 W, which is the power supplied by SP2.2 to D2 when SP1.1 fails. The T column for SP1.1 and SP1.2 specifies the total power supplied by those PS elements. For example, SP1.1 supplies non-failure power of 275 W, (Circle 503) that is 100 W to SP2.1 and 175 W to SP2.2.

Table 501 also specifies the non-failure and failure powers of each parent PS element and the reserve power for each parent PS element. The T column for SP1.1 and SP1.2 specifies the total power supplied by those PS elements. For example, SP1.1 supplies non-failure power of 275 W (circle 503), that is 100 W to SP2.1 and 175 to SP2.2. The non-failure power for SP1.1 is 275 W (i.e., 100 W+175 W) (circle 503), and the failure power for SP1.1 is 191 W (i.e., (133 W+250 W)/2) (circle 504) when SP2.1 fails. When SP2.1 fails, SP1.1 supplies no power, and SP2.2 supplies 383 W, which is the sum of the failure powers of SP2.2 when SP2.1 fails. Since SP1.1 and MP both supply power to SP2.2, each supplies half of the 383 W, which is 191 W. The reserve power for SP1.1 is 175 W (circle 505). FIGS. 6 and 7 illustrate the calculation of values in the SP1.1 and the SP1.2 columns of table 501.

FIG. 6 contains a matrix 600 illustrating calculation of the values for a non-failure condition of table 501. Matrix 600 indicates the consumed power of the PC elements and the power supplied by each PS element (rows) to each of its child power elements (columns) for the power distribution system of diagram 500. For example, D1 consumes 400 W (circle 604). SP1.2 supplies 250 W (circle 601) to D2 and 350 W (circle 602) to SP2.3. The total column contains the total of each row. For example, the total for row SP1.1 is 275 W (circle 603), which corresponds to the power of 275 W (circle 503) supplied by SP1.1 with a non-failure condition as illustrated in table 501.

FIG. 7 contains a matrix 700 illustrating calculation of the values for a failure condition of table 501. Matrix 700 indicates the consumed power of the PC elements and, for the failure condition of SP2.1, the failure power that each PS element supplies to a power element. Like matrix 600, matrix 700 indicates the consumed power of the PC elements and the power supplied by each PS element (rows) to each of its child power elements (columns) for the power distribution system of diagram 500. For example, D2 consumes 1000 W (circle 701). SP1.2 supplies 250 W (circle 702) to D2 and 383 W (circle 703) to SP2.3 when SP2.1 fails. The total column contains the total of each row. For example, the total for row SP1.2 is 633 W (circle 704), which corresponds to the power of 633 W (circle 506) supplied by SP1.1 when SP2.1 fails.

Figure 8:
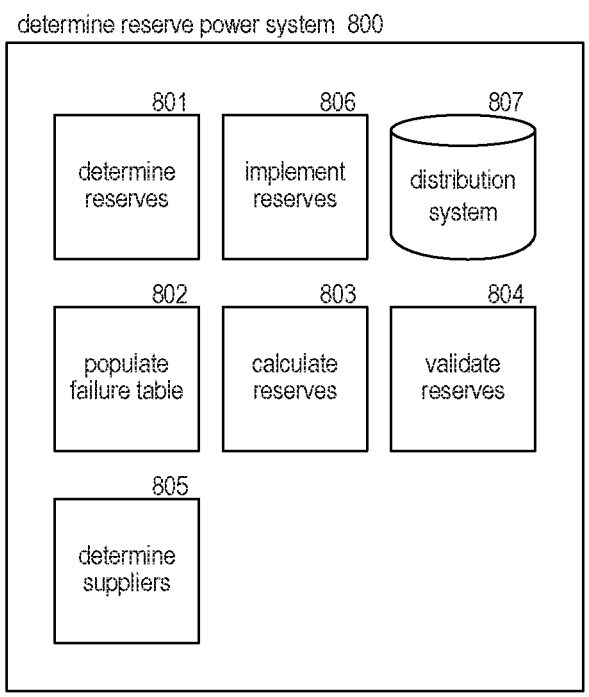
FIG. 8 is a block diagram that illustrates components of a determine reserve power system in some embodiments.

FIG. 8 is a block diagram that illustrates components of a determine reserve power system in some embodiments. The DRP system 800 includes a determine reserves component 801 and an implement reserves component 806. The determine reserves component determines the power reserve for each PS element of a power distribution system. The determine reserves component invokes a populate failure table component 802, a calculate reserves component 803, and validate reserves component 804. The populate failure table component populates a matrix of a failure table for each failure condition. The calculate reserves component calculates the reserve power for each PS element based on the populated failure table. The validate reserves component validates whether the power reserves and the consumed powers can be supported by the power distribution system for each failure condition. The determine suppliers component is invoked by the populate failure table component to determine, for each failure condition, the number of suppliers to each power element. The implement reserves component may invoke the determine reserves component repeatedly to identify a configuration of the power distribution system for which each PS element has sufficient capacity to support its reserve power. The implement reserves component can direct a power connection system directs a power connection system to implement the identified configuration. The DRP system also includes a distribution system store 807 that stores the configuration information of a power distribution system. The configuration information specifies the power elements, the capacities of the PS elements, the consumed power of the PC elements, and the connections between the power elements.

The computing systems (e.g., network nodes or collections of network nodes) on which the DRP system and the other described systems may be implemented may include a central processing unit, input devices, output devices (e.g., display devices and speakers), storage devices (e.g., memory and disk drives), network interfaces, graphics processing units, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include high-performance computing systems, cloud-based servers, desktop computers, laptops, tablets, e-readers, personal digital assistants, smartphones, gaming devices, servers, and so on. For example, the simulations and training may be performed using a high-performance computing system, and the classifications may be performed by a tablet. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on them or may be encoded with computer-executable instructions or logic that implements the DRP system and the other described systems. The data transmission media are used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys.

The DRP system and the other described systems may be described in the general context of computer-executable instructions, such as program modules and components, executed by one or more computers, processors, or other devices. Generally, program modules or components include routines, programs, objects, data structures, and so on that perform tasks or implement data types of the DRP system and the other described systems. Typically, the functionality of the program modules may be combined or distributed as desired in various examples. Aspects of the DRP system and the other described systems may be implemented in hardware using, for example, an application-specific integrated circuit ("ASIC") or field programmable gate array ("FPGA").

Figure 9:
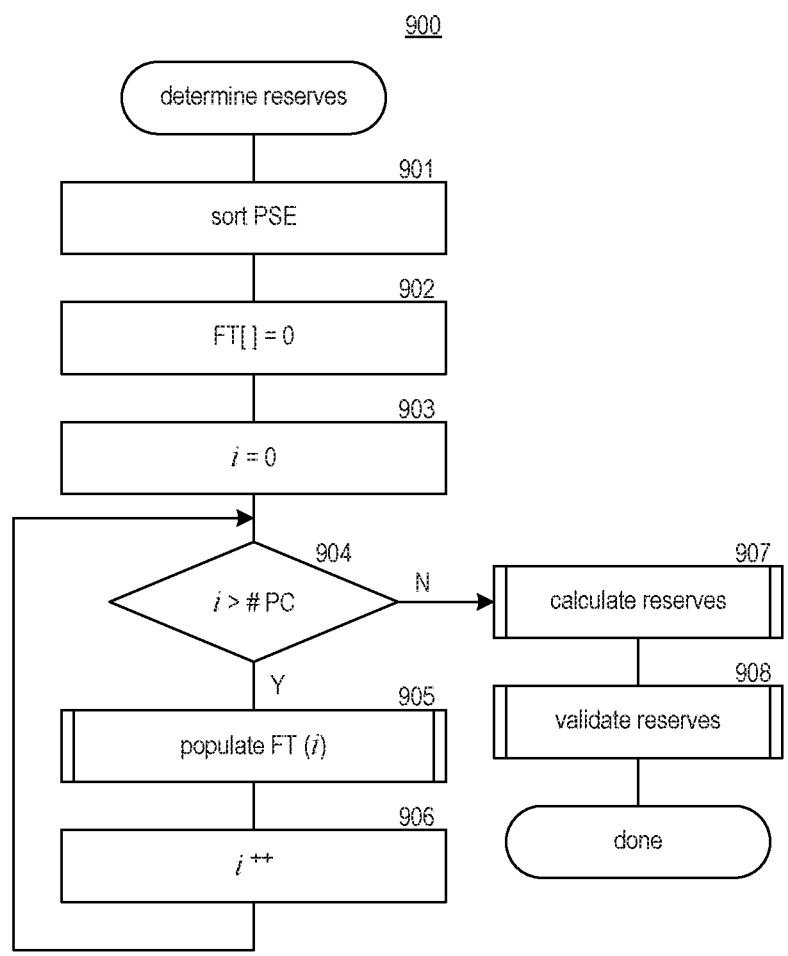
FIG. 9 is a flow diagram that illustrates the processing of a determine reserves component of a determine reserve power system in some embodiments.

FIG. 9 is a flow diagram that illustrates the processing of a determine reserves component of a determine reserve power system in some embodiments. The determine reserves component determines the power reserves for each PS element. In block 901, the component sorts a list of the power elements in order based on their maximum path length to a PC element with the PC elements being first in the list. For example, referring to FIG. 5, the list would be {D1, D3, SP2.1, SP2.2, SP2.3, SP1.1, SP1.2} as the maximum path length for SP2.x is one and for SP1.x is two. The rows of a matrix of a failure table are in the sorted order and populated in that sorted order so the row for each power element with a shorter maximum path length can be populated before the row for a PS element with a longer maximum path length. In block 902, the component initializes the failure table. The failure table may be represented by array FT[i,M[j,k]] that includes a matrix for each failure condition indexed by the variable i. Each matrix contains a row (indexed by variable j) for each power element in the sorted order and a column (indexed by variable k) for each power element in the sorted order. In block 903-906, the component loops populating each matrix of the failure table. In block 903, the component initializes variable i to index through the failure conditions with the value of 0 corresponding to the non-failure condition. In decision block 904, if the variable i is greater than the number of PS elements, then the failure table has been fully populated and the component continues at block 907, else the component continues at block 905. In block 905, the component invokes the populate failure table component passing the variable i. In block 906, the component increments the variable i and loops to block 904 to index the matrix for the next failure condition. In block 907, the component invokes the calculate reserves component to calculate the reserves for populated failure table. In block 908, the component invokes the validate reserves component to validate the failure table. The component then completes.

Figure 10:
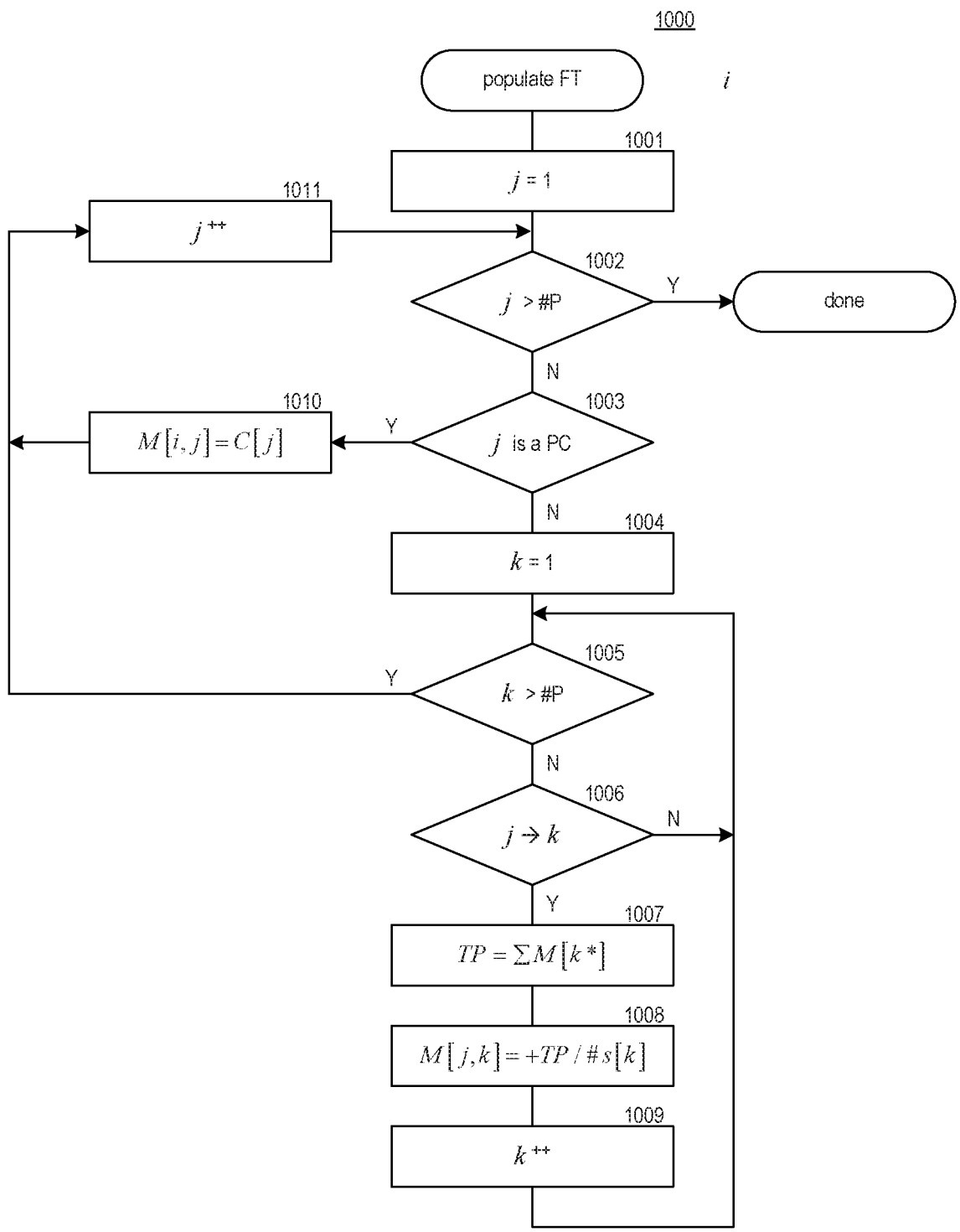
FIG. 10 is a flow diagram that illustrates the processing of a populate failure table component of the determine power reserve system in some embodiments.

FIG. 10 is a flow diagram that illustrates the processing of a populate failure table component of the determine power reserve system in some embodiments. The populate failure table component 1000 is passed the variable i, which indexes a failure condition, and populates a matrix for that failure condition. In block 1001, the component initializes variable j, which indexes the rows of the matrix. Although not illustrated the component invokes the determine suppliers component to determine the number of suppliers #S to each power element for the failure condition. In decision block 1002, if the variable j is greater than the number of power elements #P, then the matrix is fully populated and the component completes, else the component continues at block 1003. In decision block 1003, if the variable j indexes a PC element, then the component continues at block 1010, else the component continues at block 1004. In block 1004, the component initializes the variable k, which indexes the columns of the matrix. In decision block 1005, if variable k is greater than the number of power elements #P, then the row for the power element indexed by variable i is fully populated and the component continues at block 1011, else the component continues at block 1006. In decision block 1006, if the power element indexed by the variable j has a connection to the power element indexed by the variable k, then the component continues at block 1007, else the component loops to block 1005. In block 1007, the component sets the total power supplied by the PS element indexed by the variable k to the sum of the values in the row indexed by the variable k. In block 1008, the component adds the power supplied by the PS element indexed by variable j to the total power TP supplied by the PS element or consumed by the PC element indexed by the variable k divided by the number of PS elements that supply power to the power element indexed by the variable k. The total power supplied is the sum of the row indexed by the variable k. In block 1009, the component increments the variable k and loops to block 1005. In block 1010, the component sets the value of the row and column of the matrix indexed by the variable j, which indexes a PC element to the consumption of the indexed PC element. In block 1011, the component increments the variable j and loops to block 1002.

Figure 11:
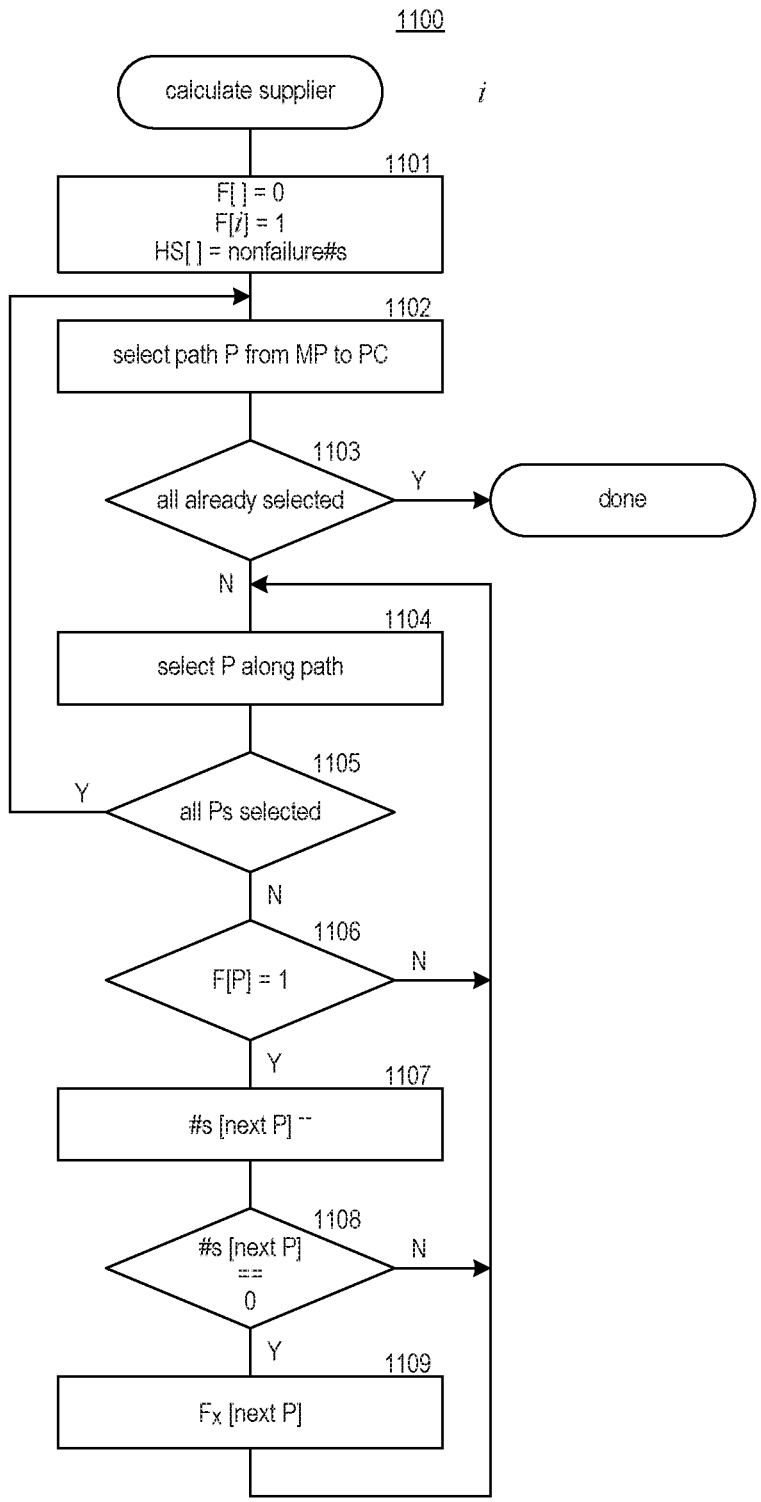
FIG. 11 is a flow diagram that illustrates the processing of a calculate suppliers component of the determine reserve power system in some embodiments.

FIG. 11 is a flow diagram that illustrates the processing of a calculate suppliers component of the determine reserve power system in some embodiments. The calculate suppliers component calculates the number of suppliers #S for the failure condition as indicated by the passed variable i. The number of suppliers #S for each power element is initialized to the number of supplier for the non-failure condition. block 1101, the component sets all values in a failed array F to all zeros except for the value indexed by the variable i. The failed array F tracks each PS element that does not supply power because of the failure condition. The component initializes the of suppliers to each power element to the non-failure number of suppliers. In block 1102, the component selects the next path of connections from an MP element to a PC element. In decision block 1103, if all the paths have already been selected, then the component completes, else the component continues at block 104. In block 1104, the component selects another power element P (except the PC element) along the path in the order starting from the MP element. In decision block 105, if all the power elements along the path have of already been selected, then the component loops to block 1102 to select the next path, else the component continues at block 1106. In decision block 1106, if the selected P element is indicated as having failed, then the component continues at block 1107, else the component loops to block 1104 to select another power element along the path. In block 1107, the component decrements number of suppliers for the next power element nextP along the path. In decision block 1108, if the number of suppliers for the next power element along the path is zero, then the component continues at block 1109, else the component loops to block 1104 to select the next power element along the path. In block 1109, the component indicates that the next power supply element has failed loops to block 1104 to select the next power supply element.

Figure 12:
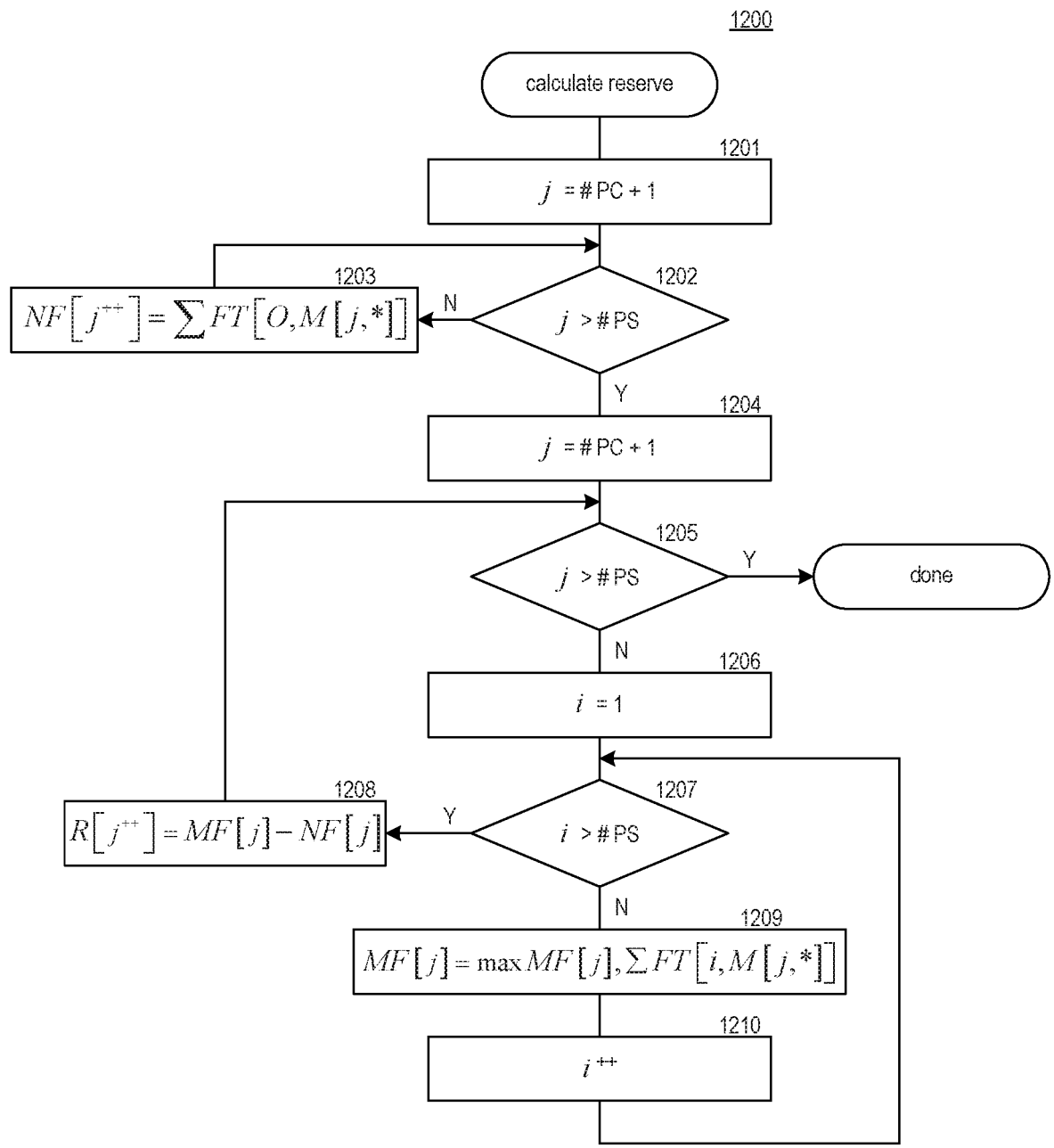
FIG. 12 is a flow diagram that illustrates the processing of a calculate reserve component of the determine reserve power system in some embodiments.

FIG. 12 is a flow diagram that illustrates the processing of a calculate reserve component of the determine reserve power system in some embodiments. The calculate reserves component 1200 is invoked to calculate the reserve powers for the PS elements. In block 1201, the component initializes the variable j to the number of PC elements plus one. In decision block 1202, if variable j is greater than the number of PC elements, then the component continues at block 1204, else the component continues at block 1203. In block 1203, the component sets a value in a non-failure array NF indexed by the variable j to the value that is the sum of values in the row indexed by the variable j of the matrix indexed by zero (i.e., the non-failure matrix). The component then increments the variable j and then loops to block 1202. In block 1204, the non-failure array has been initialized to the non-failure power of each PS element and, the component again initializes the variable j to the number of PC elements plus one. In decision block 1205, if the variable j is greater than the number of PS elements, then the component completes, else the component continues at block 1206. In block 1206, the component initializes the variable i to one for selecting the failure condition for each PS element. In decision block 1207, if the variable i is greater than the number of PS elements, then the component continues at block 1208, else component continues at block 1209. In block 1209, the component sets the maximum failure power array MF for the PS element indexed by variable j to the maximum failure power FP for the PS element indexed the variable j (calculated so far) and the sum of the row indexed by variable j of the matrix of the failure table indexed by the variable i. The maximum failure power array is initialized to zeros. In block 1210, the component increments the variable i and loops to block 1207. In block 1208, the component sets the reserve power to the maximum failure power for the PS element indexed by the variable j minus the non-failure power for the PS element indexed by the variable j. The component also increments the variable j and loops to block 1205.

The following paragraphs describe various embodiments of aspects of the DRP system. An implementation of the DRP system may employ any combination of the embodiments. The processing described below may be performed by a computing device with a processor that executes computer-executable instructions stored on a computer-readable storage medium that implements the DRP system.

In some embodiments, a method performed by a computing system is provided for determining reserve power for power supply ("PS") elements in a power distribution system. The method determines a non-failure power supplied by each PS element when no PS element fails. For each PS element, the method designates that PS element as failed and determines a failure power supplied by each PS element assuming that the designated PS element has failed. For each PS element, the method also determines a maximum failure power supplied by that PS element and sets a reserve power for that PS element based on the maximum failure power and the non-failure power supplied by that PS element. In some embodiments, the method directs the distribution system reserve the reserve power for each PS element. In some embodiments, the reserve power for a PS element is set to the difference between the maximum failure power and the non-failure power supplied by that PS element. In some embodiments, the reserve power for a PS element is further based on an excess reserve power. In some embodiments, the determining of power supplied by a PS element is a sum of the power that that PS element supplies to each child power element of that PS element. In some embodiments, the power supplied to a child power element is the power consumed by that child power element divided by the number of PS elements that supply power to that child power element. In some embodiments, the power distribution system supplies power to servers in a server farm with the servers being power consumption elements. In some embodiments, the power distribution system supplies power to servers in a data center with the servers being power consumption elements. In some embodiments, the method validates whether each PS element has the capacity to supply the reserve power for that PS element. In some embodiments, the method validates whether each power consumption element can be supplied its consumed power irrespective of which PS element fails.

In some embodiments, method performed by a computing system is provided for determining a reserve resource supply for resource supply ("RS") elements in a resource supply system. The method determines a non-failure resource supply supplied by each RS element without a failed RS element. For each RS element, the method determines a maximum failure resource supply supplied by that RS element when a RS element fails and sets a reserve power for that RS element based on the maximum failure resource supply and the non-failure resource supply supplied by that RS element. In some embodiments, the resource supply system is a power distribution system. In some embodiments, the resource supply system is a communication bandwidth supply system. In some embodiments, for each RS element, the method designates that RS element as failed and determines a failure resource supply supplied by each RS element when the designated RS element has failed. In some embodiments, the determining of a maximum failure resource supply supplied by a RS element is based on concurrent failure of multiple RS elements. In some embodiments, the reserve resource supply for a RS element is set to the difference between the maximum failure resource supply and the non-failure resource supply supplied by that RS element. In some embodiments, the reserve resource supply for a RS element is further based on an excess reserve resource supply. In some embodiments, the determining of the resource supply supplied by a RS element is a sum of the resource supply that that RS element supplies to each child resource element of that RS element. In some embodiments, the resource supply supplied by a RS element to a child consumption resource element is the resource supply consumed by that child consumption resource element divided by the number of RS elements that supply power to that child consumption resource element. In some embodiments, the resource supply supplied by a RS element to a child RS element is the resource supply supplied by that child RS element divided by the number of RS elements that supply power to that child RS element. In some embodiments, the method validates whether each RS element has the capacity to supply the reserve supply for that RS element. In some embodiments, the method validates whether each resource consumption element can be supplied its consumed resource supply irrespective of which RS element fails.

In some embodiments, a computing system is provided for determining reserve power for power supply ("PS") elements in a power distribution system. The computing system includes one or more computer-readable storage medium for storing computer-executable instructions and one or more processor for executing the computer-executable instructions stored in the one or more computer-readable storage mediums. The instructions control the computing system to determine a non-failure power supplied by each PS element without a failed PS element and determine for each PS element a maximum failure resource power supplied by that PS element when a PS element fails. The instructions control the computing system to set a reserve power for each PS element based on the maximum failure power and the non-failure power supplied by that PS element. In some embodiments, the power distribution system supplies power to servers. In some embodiments, the computer-executable instructions include instructions to validate whether each PS element has the capacity to supply the power for that RS element. In some embodiments, the computer-executable instructions include instructions to validate whether each power consumption element can be supplied its consumed power supply irrespective of which PS element fails.

In some embodiments, a computing system is provided for determining whether current reserve power for power supply ("PS") elements in a power distribution system that supplies power to power consumption ("PC") elements is sufficient reserve power to support supplying power to an additional PC element. The computing system includes one or more computer-readable storage medium for storing computer-executable instructions and one or more processor for executing the computer-executable instructions stored in the one or more computer-readable storage mediums. The instructions control the computing system to access the current reserve power for each PS element. For each PS element of a plurality of PS elements, the instructions control the computing system to determine a needed reserve power that PS element when power is supplied to the current PC elements and the additional PC element and determine whether the current reserve power of that PS elements is sufficient to support the needed reserve power. In some embodiments, the computer-executable instructions further include instructions to, for each PS element, when the needed reserve power for a PS element is not greater than the current reserve power for that PS element, indicate that the reserve power for that PS element is sufficient. In some embodiments, the computer-executable instructions further include instructions to when the needed reserve power for a PS element is greater than the current reserve power for that PS element, indicate that the reserve power for that PS element is not sufficient. In some embodiments, the power distribution system supplies power to servers. In some embodiments, the computer-executable instructions include instructions to determine whether the current reserve power for the PS elements is sufficient reserve power to support supplying power to an additional server.

In some embodiments, a computing system for determining a reserve resource supply for resource supply ("RS") elements in a resource supply system. The computing system includes one or more computer-readable storage medium for storing computer-executable instructions and one or more processor for executing the computer-executable instructions stored in the one or more computer-readable storage mediums. The instructions control the computing system to access a non-failure resource supply supplied by each RS element without a failed RS element. For each RS element, the instructions control the computing system to set a reserve power for that RS element based on a maximum failure resource supply supplied by that RS element when a RS element fails and the non-failure resource supply supplied by that RS element. In some embodiments, the resource supply system is a power distribution system. In some embodiments, the resource supply system is a communication bandwidth supply system. In some embodiments the computer-executable instructions further control the computing system to, for each RS element, designate that RS element as failed and determine a failure resource supply supplied by each RS element when the designated RS element has failed. In some embodiments, the computer-executable instructions include instructions to determine whether the current reserve resource supply for the RS elements is sufficient reserve resource supply to support supplying power to an additional resource consumption element. In some embodiments, the computer-executable instructions include instructions to determine whether the current reserve resource supply for the RS elements is sufficient reserve power to support supplying resource supply to an additional resource consumption element.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

I claim:

1. A method performed by a computing system for determining reserve power for power supply ("PS") elements in a power distribution system that can be configured in accordance with a number of different configurations, including a first configuration having a hierarchy of PS elements in which some of the PS elements supply power to other PS elements, each PS element having a capacity power, the method comprising:
- determining a non-failure power supplied by each PS element when no PS element fails;
- for each PS element,
  - designating that PS element as failed; and
  - determining a failure power supplied by each PS element assuming that the designated PS element has failed;
- for each PS element,
  - determining a maximum failure power supplied by that PS element; and
  - setting a reserve power for that PS element based on the maximum failure power and the non-failure power supplied by that PS element; and
- when the capacity power of each PS element is greater than a sum of the non-failure power and the reserve power of that PS element, configuring the power distribution system in accordance with the first configuration at least in part by changing connections between PS elements in the power distribution system; and
- directing the power distribution system to reserve the reserve power set for each PS element.

2. The method of claim 1, wherein the reserve power for a PS element is set to the difference between the maximum failure power and the non-failure power supplied by that PS element.

3. The method of claim 1, wherein the reserve power for a PS element is further based on an excess reserve power.

4. The method of claim 1, wherein the determining of the non-failure power supplied by a PS element is a sum of the power that that PS element supplies to each child power element of that PS element.

5. The method of claim 1, wherein the power distribution system supplies power to servers in a server farm with the servers being power consumption elements.

6. The method of claim 1, wherein the power distribution system supplies power to servers in a data center with the servers being power consumption elements.

7. The method of claim 1, further comprising validating whether each power consumption element can be supplied its consumed power irrespective of which PS element fails.

8. A method performed by a computing system for determining reserve power for power supply ("PS") elements in a power distribution system that can be configured in accordance with a number of different configurations, including a first configuration having a hierarchy of PS elements in which some of the PS elements supply power to other PS elements, each PS element having a capacity power, the method comprising:
- determining a non-failure power supplied by each PS element when no PS element fails;
- for each PS element,
  - designating that PS element as failed; and
  - determining a failure power supplied by each PS element assuming that the designated PS element has failed;
- for each PS element,
  - determining a maximum failure power supplied by that PS element; and
  - setting a reserve power for that PS element based on the maximum failure power and the non-failure power supplied by that PS element; and
- directing the power distribution system to reserve the reserve power set for each PS element,
- when the capacity of each PS element is greater than a sum of the non-failure power and the reserve power of that PS element, configuring the power distribution system in accordance with the first configuration at least in part by changing connections between PS elements in the power distribution system,
- wherein the determining of the non-failure power supplied by a PS element is a sum of the power that that PS element supplies to each child power element of that PS element, and
- wherein the power that a PS element supplies to a child power element is an amount of power consumed by that child power element divided by a number of PS elements that supply power to that child power element.

9. A method performed by a computing system for determining a reserve resource supply for resource supply ("RS") elements in a resource supply system, each RS element having a capacity resource supply, the method comprising:
- determining a non-failure resource supply supplied by each RS element without a failed RS element;
- for each RS element,
  - determining a maximum failure resource supply supplied by that RS element when a RS element fails; and
  - setting a reserve resource supply for that RS element based on the maximum failure resource supply and the non-failure resource supply supplied by that RS element;
- when the capacity resource supply of each RS element is greater than a sum of the non-failure resource supply and the reserve resource supply of that RS element, configuring the resource supply system in accordance with a first configuration having a hierarchy of RS elements in which some of the RS elements supply resources to other RS elements at least in part by changing connections between RS elements in the resource supply system,
- wherein a resource supply supplied by a RS element to a child RS element is a resource supply supplied by that child RS element divided by a number of RS elements that supply a resource supply to that child RS element, and
- wherein the resource supply system is a power distribution system, the method further comprising directing the power distribution system to reserve the reserve resource supply set for each RS element.

10. The method of claim 9 further comprising, for each RS element, designating that RS element as failed and determining a failure resource supply supplied by each RS element when the designated RS element has failed.

11. The method of claim 9, wherein the determining of a maximum failure resource supply supplied by a RS element is based on concurrent failure of multiple RS elements.

12. The method of claim 9, wherein the reserve resource supply for a RS element is set to the difference between the maximum failure resource supply and the non-failure resource supply supplied by that RS element.

13. The method of claim 12 wherein the reserve resource supply for a RS element is further based on an excess reserve resource supply.

14. The method of claim 9, wherein the determining of the non-failure resource supply supplied by a RS element is a sum of the resource supply that that RS element supplies to each child resource element of that RS element.

15. A method performed by a computing system for determining a reserve resource supply for resource supply ("RS") elements in a resource supply system, each RS element having a capacity resource supply, the method comprising:
  determining a non-failure resource supply supplied by each RS element without a tailed RS element;
  for each RS element,
    determining a maximum failure resource supply supplied by that RS element when a RS element fails; and
    setting a reserve resource supply for that RS element based on the maximum failure resource supply and the non-failure resource supply supplied by that RS element; and
  when the capacity resource supply of each RS element is greater than a sum of the non-failure resource supply and the reserve resource supply of that RS element, configuring the resource supply system in accordance with a first configuration having a hierarchy of RS elements in which some of the RS elements supply resources to other RS elements at least in part by changing connections between RS elements in the resource supply system,
  wherein a resource supply supplied by a RS element to a child consumption resource element is a resource supply consumed by that child consumption resource element divided by a number of RS elements that supply a resource supply to that child consumption resource element, and
  wherein the resource supply system is a power distribution system, the method further comprising directing the power distribution system to reserve the reserve resource supply set for each RS element.

16. The method of claim 15, wherein the reserve resource supply for a RS element is set to the difference between the maximum failure resource supply and the non-failure resource supply supplied by that RS element.

17. The method of claim 15, wherein the reserve resource supply for a RS element is further based on an excess reserve resource supply.

18. The method of claim 15, wherein the determining of the non-failure resource supply supplied by a RS element is a sum of the resource supply that that RS element supplies to each child resource element of that RS element.

19. A computing system for determining a reserve resource supply for resource supply ("RS") elements in a resource supply system, wherein the resource supply system supplies power to servers, that can be configured in accordance with a number of different configurations, including a first configuration having a hierarchy of RS elements in which some of the RS elements supply resources to other RS elements, each RS element having a capacity resource supply, the computing system comprising:
  one or more computer-readable storage media for storing computer-executable instructions for controlling the computing system to:
    access a non-failure resource supply supplied by each RS element without a failed RS element; and
    for each RS element, set a reserve resource supply for that RS element based on a maximum failure resource supply supplied by that RS element when a RS element fails and the non-failure resource supply supplied by that RS element;
    when the capacity resource supply of each RS element is greater than a sum of the non-failure resource supply and the reserve resource supply of that RS element, configure the resource supply system in accordance with the first configuration at least in part by changing connections between RS elements in the resource supply system,
      wherein the computer-executable instructions further control the computing system to, for each RS element, designate that RS element as failed and determine a failure resource supply supplied by each RS element when the designated RS element has failed,
    direct the resource supply system that supplies power to servers to reserve the reserve resource supply set for each RS element; and
  one or more processor for executing the computer-executable instructions stored in the one or more computer-readable storage media.

20. A computing system for determining a reserve resource supply for resource supply ("RS") elements in a resource supply system, wherein the resource supply system is a power distribution system, that can be configured in accordance with a number of different configurations, including a first configuration having a hierarchy of RS elements in which some of the RS elements supply resources to other RS elements, each RS element having a capacity resource supply, the computing system comprising:
  one or more computer-readable storage media for storing computer-executable instructions for controlling the computing system to:
    access a non-failure resource supply supplied by each RS element without a failed RS element; and
    for each RS element, set a reserve resource supply for that RS element based on a maximum failure resource supply supplied by that RS element when a RS element fails and the non-failure resource supply supplied by that RS element;
    when the capacity resource supply of each RS element is greater than a sum of the non-failure resource supply and the reserve resource supply of that RS element, configure the resource supply system in accordance with the first configuration at least in part by changing connections between RS elements in the resource supply system,
      wherein the computer-executable instructions further control the computing system to, for each RS element, designate that RS element as faded and determine a failure resource supply supplied by each RS element when the designated RS element has failed; and
    direct the resource power distribution system to reserve the reserve resource supply set for each RS element; and
  one or more processor for executing the computer-executable instructions stored in the one or more computer-readable storage media.

21. The computing system of claim 20, wherein the computer-executable instructions include instructions to validate whether each RS element can be supplied its consumed resource supply irrespective of which RS element fails.

* * * * *